United States Patent [19]

Doherty et al.

[11] 4,135,770

[45] Jan. 23, 1979

[54] DIE SET LEADER PIN

[76] Inventors: Norman R. Doherty, 870 Main St., Farmingdale, N.Y. 11735; Richard F. Doherty, 61 Lion La., Westbury, N.Y. 11590

[21] Appl. No.: 837,830

[22] Filed: Sep. 29, 1977

Related U.S. Application Data

[62] Division of Ser. No. 681,693, Apr. 29, 1976, Pat. No. 4,056,029.

[51] Int. Cl.[2] .................... F16C 1/26

[52] U.S. Cl. .................... 308/4 C

[58] Field of Search .............. 308/4 C, 4 R, 3 R, 5 R, 308/237; 83/575

[56] References Cited

U.S. PATENT DOCUMENTS 2,749,987 6/1956 Janiszewski .................... 308/4 C 4,003,283 1/1977 Janiszewski .................... 308/4 C X

*Primary Examiner*—Galen L. Barefoot
*Assistant Examiner*—Douglas C. Butler
*Attorney, Agent, or Firm*—Bauer & Amer

[57] ABSTRACT

A novel die set and a power pack that is adapted to be mounted thereon define, in part, the improved punch press comprising the present invention. Hollow, magnetizable leader pins having spring actuated stripper buttons therein are used as the armature for the power pack which also includes coil positioned concentrically about at least one end of the leader pins. The coil may be made in several discrete sections which are electrically connected parallel to each other and where more than one coil is utilized, the plurality of coils are also connected in parallel to each other. The power pack comprising the present invention is readily attachable to the movable portions of the die set.

4 Claims, 8 Drawing Figures

DIE SET LEADER PIN

This is a division of application Ser. No. 681,693 filed Apr. 29, 1976, now U.S. Pat. No. 4,056,029, issued Nov. 1, 1977.

BACKGROUND OF THE INVENTION

This invention relates generally to power tools and more particularly to an electrically actuated power press. Other novel features of the present invention relate to improved coil means that are integral with a novel power pack which is removably coupled to the die set as well as novel leader pin means that cooperate with the coil means.

DESCRIPTION OF THE PRIOR ART

There is a longstanding need for a low cost punch press that may be operated at relatively high speeds and with sufficient power to perform a wide variety of operations. While there are many punch presses presently on the market, these devices are generally large and cumbersome. The most common devices in the prior art are those punch presses that are operated by means of a flywheel or by hydraulic pressure that requires a source of compressed air. Specifically, a need exists for a small, high capacity die set or punch press that can be operated on a bench, particularly for performing small stamping and assembly operations.

My U.S. Pat. No. 3,709,083 granted on Jan. 9, 1973, discloses a device in the same field to which the present invention is directed. In my issued U.S. patent, there is disclosed a die set that is used in small power and foot presses and which comprises a base member or die shoe having an anvil, precisely positioned leader pins and a head member or tool holder that is opposed to the anvil and which includes bushings which are slidable over the leader pins. The die sets disclosed in my foregoing issued U.S. patent are commercially available, for example, from the Acme Danneman Co., Inc. of New York, or Lamina-Bronze Products of Royal Oak, Mich. They are relatively low in cost and have the additional advantage of being interchangeable. The power source in my aforementioned issued U.S. patent is in the form of an improved solenoid that is coupled to and arranged to periodically displace the movable member or tool holder of the die set. My patented solenoid acts substantially faster than was possible with prior art power sources and, therefore, minimizes bending forces on the leader pin so that relatively lightweight components may be utilized. The solenoid in my issued U.S. patent is wound with an aluminum foil coil in place of the more conventional wire wound coil.

SUMMARY OF THE INVENTION

The present invention distinguishes over my issued U.S. patent in that each leader pin is used as the armature for a solenoid. Whereas in my issued U.S. patent the solenoid was provided with its own axially displaceable armature, the present invention contemplates positioning of the coil means about one end of the leader pins so that when the coil means are energized, the housing in which the coil means are secured and which is, in turn, secured to the movable portion of the die set will displace the movable portion of the die set in the direction towards the fixed portion of the die set.

The coil means comprising the present invention comprises a bobbin and a plastic insulating material which encapsulates conductive wire means that are wound on the bobbin. The coil means of the present invention may be made in several sections, all of which are electrically connected to each other in parallel. Preferably, one of the coil means comprising the present invention is cooperatively associated with each leader pin and, where there are a plurality of leader pins and a plurality of coil means, the coil means are electrically connected to each other in parallel.

The novel leader pins comprising the present invention eliminate the need for stripping means utilized in prior art die sets. In the present invention, the leader pins are hollow and include therein a button that is axially movable relative to the leader pin. The button is spring biased and arranged to bear against a portion of the power pack in order to move the power pack, and hence the movable portion of the die set, in a direction away from the fixed portion of the dies set after the power or working stroke. Preferably, a threaded plug is mounted in the opposite end of the leader pin and bears against the spring that biases the button in order to vary the force of the spring.

Accordingly, it is an object of the present invention to provide an improved power pack for a die set.

It is another object of the present invention to provide, as described above, an improved power pack that may be readily coupled to and removed from a conventional die set.

Still another object of the present invention is to provide an improved power pack for a die set wherein the power pack comprises coil means that are concentric with the leader pins of the die set.

Still another object of the present invention is to provide an improved die set wherein the leader pins thereof are used in combination with and define the armature of the solenoid of a power pack.

A further object of the present invention is to provide an improved die set, as described above, that does not require conventional stripper means.

Still another object of the present invention is to provide an improved die set, as described above, wherein the leader pins include an axially movable, spring biased button that functions as a stripper device.

A further object of the present invention is to provide an improved power pack for a die set wherein the power pack includes coil means that cooperate with the leader pins of the die set and wherein the coil means are comprised of a plurality of wire wound sections that are electrically in parallel with each other.

Yet another object of the present invention is to provide a plurality of improved coil means, as described above, that are electrically connected to each other in parallel and wherein each of the coil means cooperates with a leader pin of the die set.

These and other objects, features and advantages of the invention will, in part, be pointed out with particularity, and will, in part, become obvious from the following more detailed description of the invention, taken in conjunction with the accompanying drawing, which forms an integral part thereof.

BRIEF DESCRIPTION OF THE DRAWINGS

In the various figures of the drawing, like reference characters designate like parts.

In the drawing.

DESCRIPTION OF THE PREFERRED EMBODIMENT

Figure 1:
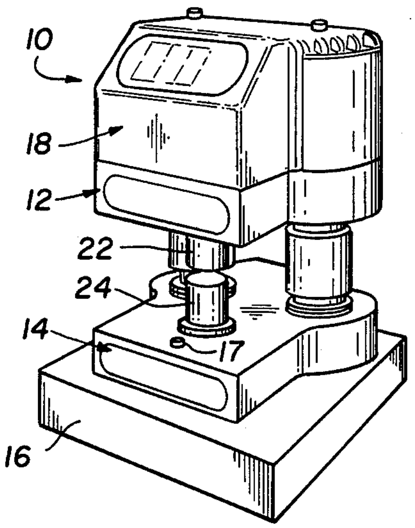
FIG. 1 is a perspective view illustrating one form of the present invention.
Figure 3:
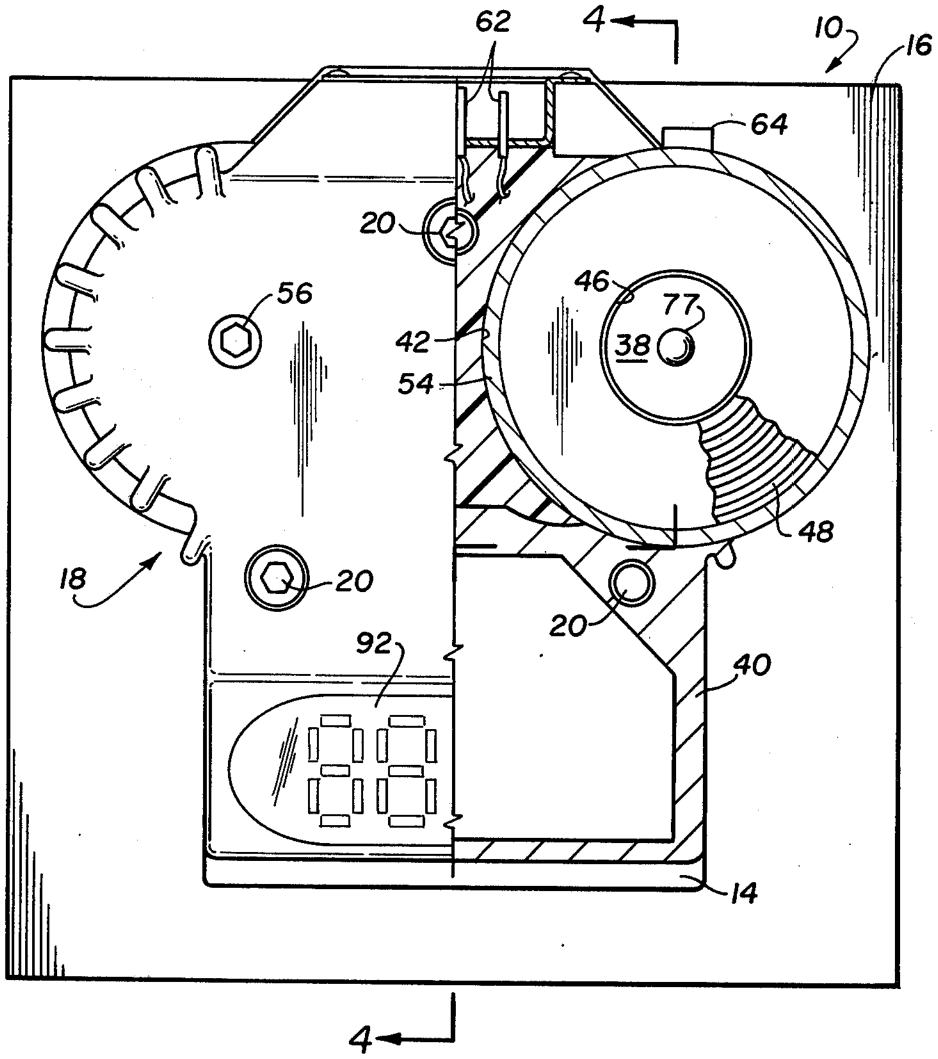
FIG. 3 is a sectional plan view taken along line 3—3 of FIG. 2.
Figure 2:
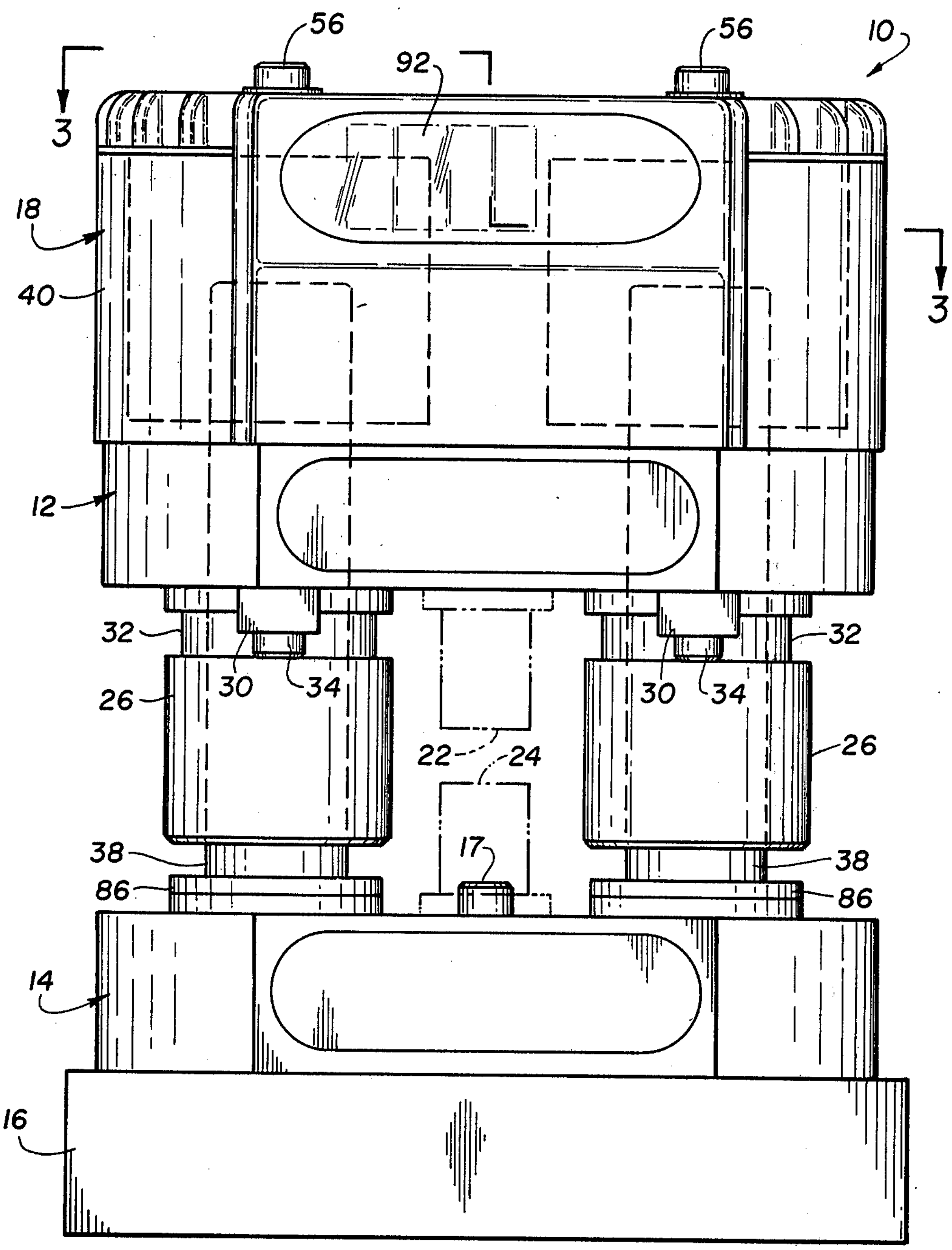
FIG. 2 is a front elevational view of the structure shown in FIG. 1.
Figure 7:
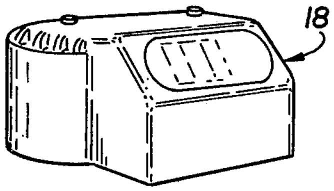
FIG. 7 is a perspective view of the power pack prior to installation in a punch press.

Referring now to the drawing, there is shown in FIG. 1 an improved punch press 10 comprising the several novel features of the present invention. The punch press 10 is comprised of an upper, movable section or tool holder 12 and a lower, non-movable section or die shoe 14. A base member 16 supports and retains the lower member 14 by means of a plurality of fasteners 17 and a power pack 18 (FIG. 7) is removably mounted on the upper member 12 by means of three screws 20 (FIG. 3). A schematically illustrated tool 22 is suitably secured to the upper movable section 12 and a schematically illustrated anvil 24 is suitably secured to the lower member 14.

In the embodiment illustrated, a pair of bushings 26 are secured to the upper movable sections 12. The bushings 26 are received in openings 28 formed in the upper section 12 and are clamped thereto by means of dogs 30 that engage an undercut 32 formed in the bushing 26. Fasteners 34 are used for removably securing the dogs 30 to the upper section 12. Each bushing 26 is further provided with a central bore 36 in order to be able to slide along a leader pin 38 that is secured to the non-movable lower portion 14 by any conventional means.

Figure 4:
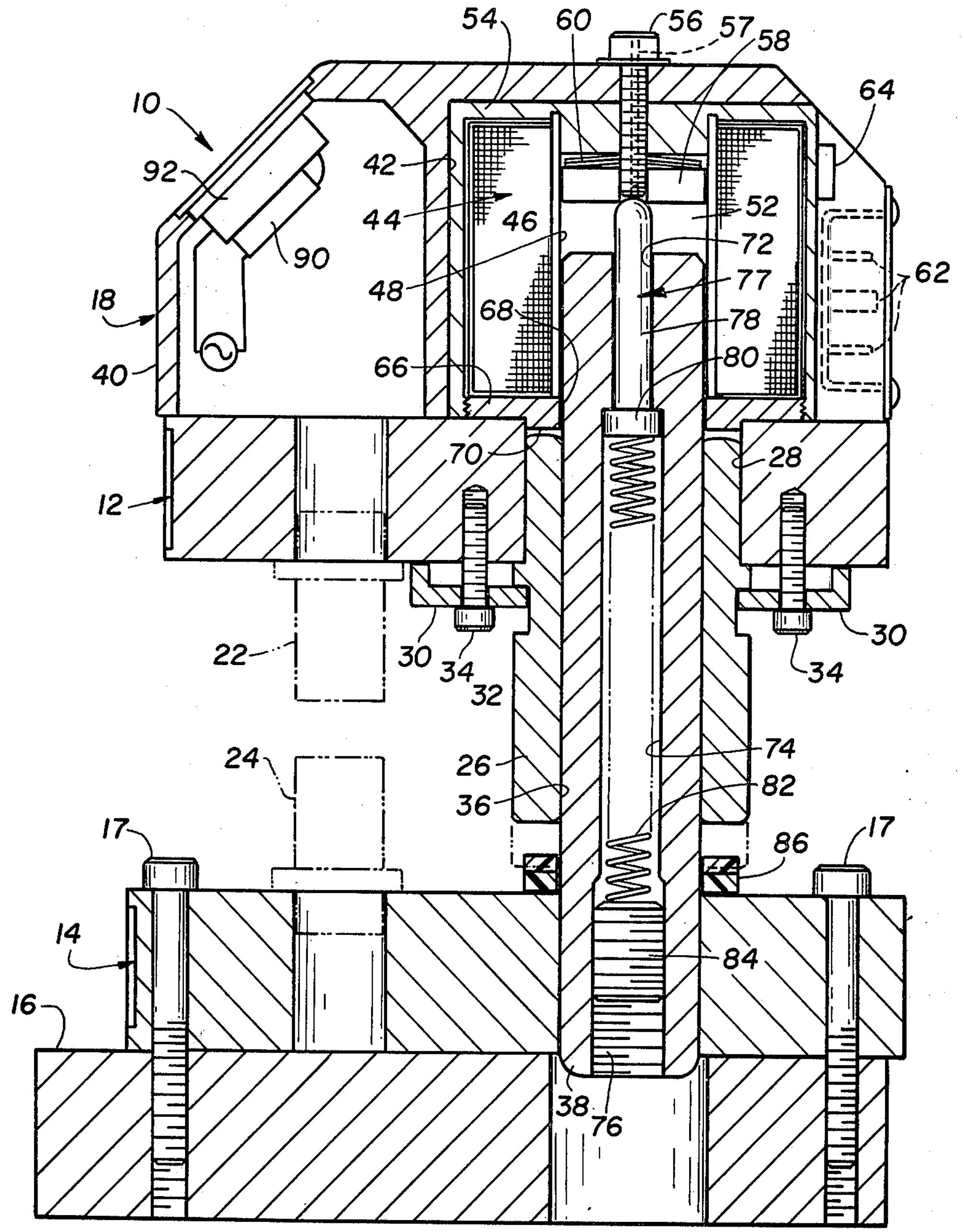
FIG. 4 is a sectional elevational view taken along line 4—4 of FIG. 3.

Referring now specifically to FIG. 4, it will be seen that the power pack 18 comprises a housing 40 which is made of a magnetizable material and which may be fabricated by a casting process. Preferably, the housing 40 is made of magnetic steel material although aluminum may also be employed. Steel is preferable since the magnetic field will be stronger and there will be a greater mass as compared to aluminum. Also, there will be less flux losses when using a form of steel as compared to aluminum since the steel will tend to contain the field. Aluminum, however, has the advantage of dissipating heat more rapidly and is generally less expensive to fabricate than steel. In any event, either material may be used as well as other magnetizable materials.

Figure 6:
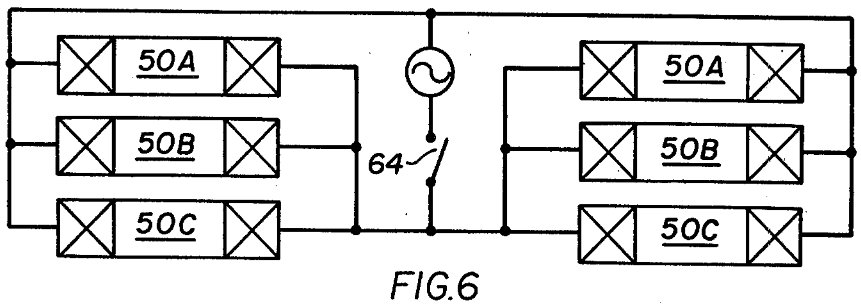
FIG. 6 is a schematic view illustrating the coil means comprising the present invention.

The housing 40 is provided with a recess 42 for receiving the coil means 44 comprising the present invention. As shown in FIG. 4, the coil means 44 comprises a bobbin 46 about which is would conductive wire means generally designated by the reference character 48 in FIG. 4. Preferably, as shown in FIG. 6, the conductive wire 48 is made in a plurality of sections 50A, 50B, 50C, etc. As noted hereinabove, a separate coil means 44 is provided in cooperative association with each leader pin 38. There may be as many coil sections 50 as desired depending upon the power required. The coil sections 50 are connected in parallel as shown in FIG. 6 and the coil means 44 for each leader pin 38 are also connected in parallel to each other. When the two coil means 44 are arranged in parallel, the total resistance is ½ of each coil means 44. Thus, if the resistance of any single coil means 44 is 1.5 ohms, the total resistance would be 0.75 ohms. In one particular application of the present invention, the total resistance would be between 0.4 and 0.5 ohms. A structure of this nature would draw over 200 amperes from a 110V source for a fraction of a cycle. Generally, when using a 110 volt power source, a 20 ampere fuse would be sufficient to provide an adequate run at approximately 120 strokes per minute.

Referring once again to FIG. 4, it will be seen that each coil means 44 has a central bore 52 defined by the bobbin 46. The coil means 44 are encapsulated in an insulating plastic material 54 which effectively closes upper end of the bobbin 48 but leaves the lower end thereof open. The upper end of the leader pin 38 is normally positioned within the bore 52. Also positioned within the bore 52 is a pin 56 which is threaded through the housing 40 and which is in communication with the bore 52. The pin 56, which has a passageway 57 formed therethrough, supports a steel slug 58 which serves as a stop whose function will be described more fully hereinafter and a Belleville spring washer 60. Terminal means 62 are also provided in the housing 40 and are electrically connected to the coil means 44 so that power pack 18 may be connected to a suitable source of current. Between the two coil means, at an appropriate location within the housing 40, a sensor 64 is provided for detecting heat. Assuming that the power pack operates at a temperature above 300° for example, the sensor 64 would act to cut out the coil system from the power source and thereby prevent burnout of the coil means 44. It should be further noted that beneath each of the coil means 44, there is provided a steel ring 66 having a central opening 68 for receiving the leader pin 38 therethrough and a reduced diameter piloting portion 70 that is received in the bore 28 of the upper section 12. The steel ring 66 serves to prevent any misalignment between the power pack 18 and the upper, movable portion 12 of the die set 10. That is, when the coil means 44 are energized and the upper portion 12 of the die 10 moves downwardly, the bobbin 46 will never touch the leader pins 38.

An important feature of the present invention is that the leader pins are used as magnetic armatures in much the same manner as in a conventional solenoid. Another important feature of the present invention is that the conventional stripper springs are eliminated. In a conventional die set after the operation has been completed, it is necessary to strip the workpiece from the tool. For instance, if a hole is being punched or blanked out, the punches must be pulled from the workpiece. Frequently, the pressure required for stripping is in the order of hundreds of pounds and for this reason stripper springs are required. In the present invention the leader pin 38 is bored out to define a first axially oriented hole 72 and a second and larger co-axially oriented hole 74. At its opposite end, each leader pin 38 is provided with internal threads 76. An elongated button 77 is provided with a shank portion 78 that is positioned within the first or smaller opening 72 in the leader pin 38 and a head 80 that is positioned in the larger bore 74 of the leader pin 38. It will be seen in FIG. 4 that the head 80 of the button 77 is urged against a transverse interface defined between the two diameters 72 and 74 by means of a spring 82. A screw 84 is threaded into the opposite end of the leader pin 38 and is used to vary the rate of the spring 82. Thus, very accurate and readily adjustable spring pressure is provided merely by rotating the screw 84. If the screw 84 is advanced in a direction towards the upper section 12, then the spring pressure or the stripping pressure is increased. Conversely, if the screw 84 is backed off or moved downwardly as shown in FIG. 4, there will be a lighter spring pressure and therefore a lighter stripping pressure.

Normally, as mentioned hereinabove, the shank 78 of the stripper button 77 extends beyond the upper end of the leader pin 38. The length of the extension is equal to the length of the working stroke of the upper section 12. That is, if a ½ inch stroke is desired, the extension of the shank 78 beyond the upper end of the leader pin 38 is also ½ inch. When the coil means 44 are energized, the upper section 12 and the power pack 18 are drawn downwardly with the leader pins 38 acting as armatures so that the bushings 26 bottom on stops 86. The shanks 78 of the buttons 77 are forced inwardly of the leader pins 38 during the downward or working stroke and thereby store energy in the springs 82. On the upward or return stroke, after the operation has been completed, the springs 82 urge the upper section 12 and the power pack 18 in an upward direction.

It should be particularly noted at this time that while a portion of the foregoing description referred to a single leader pin cooperating with a single coil means and while it is possible that such a die set could be constructed, the present invention is more particularly directed to the conventional die set having two leader pins. It should be further noted that the present invention is also applicable to those larger die sets that are provided with four leader pins. In any event, the broadest aspect of the present invention relates to the use of a leader pin as the magnetic armature for a power pack having coil means that cooperate with the leader pin in a manner of a solenoid.

Figure 5:
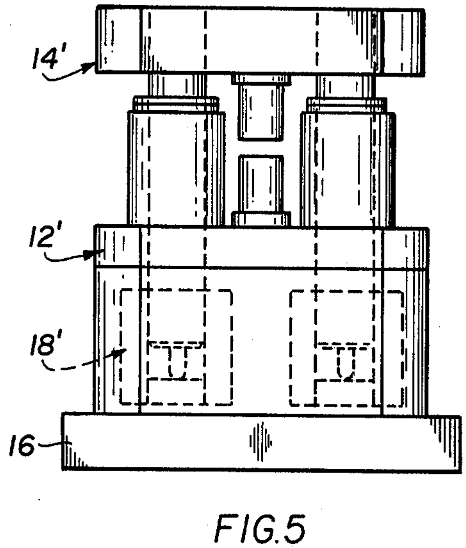
FIG. 5 is a front elevational view, similar to FIG. 2 but illustrating the present invention in an inverted position.

FIG. 5 is utilized to illustrate the possibility of using the present invention in an inverted condition wherein the power pack 18′ is mounted on a pedestal 16′. Since all of the components shown in FIG. 5 are the same as that described in connection with the embodiment of FIG. 1, further repetition of the structure and function of the components is not required.

Figure 8:
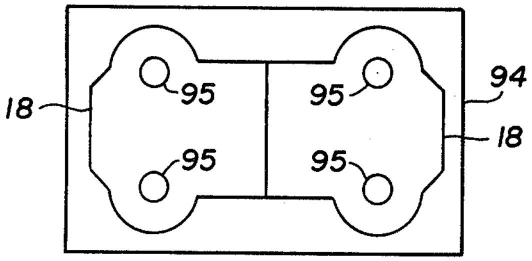
FIG. 8 is a top plan view of a pair of power heads of this invention joined in tandem.

Since some larger die sets 94 utilize four leader pins 95, it is contemplated that two power packs 18 be mechanically joined together to operate in tandem as shown in FIG. 8. The respective coils may be connected in parallel. It will be appreciated that three coils may be used for a die set utilizing three leader pins.

A feature of the present invention is the provision of the passageway 57 through the screw 56 which serves as an air vent. Air compressed within the bore 52 on the downward stroke of the upper portion 12 can be vented through the passageway 57 in the screw 56 in order to actuate a remote solenoid valve that may be used in automatic machinery. The vented air could be used to discharge the punched out piece. Alternatively, the vented air could be used to actuate an air valve to control a pneumatically powered means to pick up and feed a new workpiece. It should be particularly noted that the provision of the passageway or vent means 57 in the screw 56 is for purposes of illustration only since it could be placed elsewhere.

It has been found that a conventional magnetically actuated reed switch 90 (FIG. 4) is actuated by the magnetic field surrounding the coil 44 when the coil is energized. When the switch contact closes, an electrical circuit may be completed between a power source and a utilization device such as counter 92. The output could be used to control feeding, conveyors or the like.

From the foregoing, it will be appreciated that the structure described hereinabove is applicable to a standard die set having one or more bushings and one or more leader pins. In one broad aspect of the present invention, a power pack is removably secured to the upper, movable portion of the die set with the leader pin of the die set acting as an armature and cooperating with coil means in the power pack. The coil means encircle at least a portion of the leader pin which is made of a magnetic or magnetizable material. Each of the coil means may also be made in several sections which are electrically connected to each other in parallel relationship while, where multiple leader pins and multiple coil means are provided, the coil means would be connected to each other electrically in parallel relationship. The modified leader pin comprising the present invention eliminates the need for conventional stripper springs by providing an axially displaceable button that is spring biased in an upward direction or, more broadly, in a direction away from the lower, non-movable section of the die set. The leader pin guides the upper section during its downward movement at which time the button within the leader pin is axially displaced and the cooperating spring is compressed. After the workpiece has been appropriately acted upon, the spring within the leader pin urges the button in an upward direction to thereby move upwardly the assembly comprising the upper portion of the die set and the power pack that is movably secured thereto. Thus, the present invention eliminates the flywheel of a conventional power press.

There has been disclosed heretofore the best embodiment of the invention presently contemplated. However, it is to be understood that various changes and modifications may be made thereto without departing from the spirit of the invention.

What is claimed is:

1. An elongated leader pin for a die set, said leader pin having a bore therethrough and an elongated button slidably positioned in said bore whereby a portion of said button normally extends outwardly from a first end of said leader pin, said bore being longer than the length of said button to enable said button to be fully retracted into said leader pin during the working stroke of the die set, there being further included spring means in said bore for urging said button outwardly of the first end of said leader pin whereby said button urges one section of the die set away from another section of the die set after the working stroke thereof to return said button portion to its normally extended position.

2. The leader pin according to claim 1 wherein said bore has first and second adjacent sections defining respective first and second diameters, said button comprising a shank that is slidable in said first section and a head positioned in said second section, said spring means also being positioned in said second section and arranged to bear against said head of said button for urging said button portion normally outward of said first end of said leader pin.

3. The leader pin according to claim 1 wherein means are included for varying the force exerted by said spring means on said button.

4. The leader pin according to claim 3 wherein said force varying means comprises a plug threaded into said leader pin at the second end thereof, said plug being arranged to bear against and compress said spring when said plug is advanced in a direction towards the first end of said leader pin.

* * * * *